United States Patent
Stevenson

[15] 3,670,908
[45] June 20, 1972

[54] GLASS FURNACE WITH TRIPLE BATCH CHARGING AND METHOD

[72] Inventor: James F. Stevenson, West Hartford, Conn.
[73] Assignee: Emhart Corporation, Bloomfield, Conn.
[22] Filed: Jan. 15, 1971
[21] Appl. No.: 106,701

[52] U.S. Cl. .................................. 214/24, 65/17, 65/335, 214/18 GD, 214/152
[51] Int. Cl. ................................................ C03b 3/00
[58] Field of Search ............... 214/18 GD, 23, 24, 152; 65/17, 65/335

[56] References Cited

UNITED STATES PATENTS 2,246,375   6/1941   Lyle .................................. 214/18 GD
3,127,033   3/1964   lLyle ................................. 214/18 GD Primary Examiner—Robert G. Sheridan
Attorney—McCormick, Paulding & Huber

[57] ABSTRACT

The upstream end of a rectangular glass melting furnace is provided with a doghouse of isosceles trapezoidal shape having three openings through which batch material is introduced in discrete elongated masses, or charges by three batch chargers. Two out of three batch chargers in these openings are operated simultaneously in a predetermined sequence. The two side batch chargers operate along angularly related lines of action which converge with one another at a point also located on the line of action of the center batch charger. During operation of the two angularly related side chargers a composite batch, or mass, is formed so as to travel in a downstream direction in the furnace, and by operation of the center batch charger with one or the other of the two side batch chargers a composite mass or batch is directed angularly outwardly with respect to the downstream direction. Thus, operation of three batch chargers, in pairs, in a sequential fashion, provides a convenient means and method for charging a furnace at a rate double the rate possible with a single charger, or with two chargers operated alternately. Further, the three chargers can be operated in alternate pairs at their respective optimum speeds to provide the desired distribution of batch across the furnace.

9 Claims, 9 Drawing Figures

*INVENTOR.*
JAMES F. STEVENSON

BY

ATTORNEYS

GLASS FURNACE WITH TRIPLE BATCH CHARGING AND METHOD

BACKGROUND OF THE INVENTION

This invention relates to glass making furnaces, and deals more particularly with a method and apparatus for charging or feeding the batch through a "doghouse" portion of such a furnace.

Glass melting furnaces generally are supplied with batch from a doghouse through which the batch is fed to the melting or upstream end portion of the furnace. The batch material is generally in granular form and is discharged onto the surface of the molten glass bath in the furnace so as to be eventually melted into the body of glass in said furnace. In a typical furnace wherein glass is being made continuously, automatic batch chargers are adapted to feed batch from one or more hoppers through openings in a doghouse onto the surface of the body of molten glass. Batch fed in this manner through these several doghouse openings generally forms relatively narrow elongated masses or charges of batch material on the surface of the glass bath. For example, in U.S. Pat. No. 2,246,375 issued to Lyle June 17, 1941, a doghouse is provided in such a furnace and the doghouse defines a plurality of openings for feeding discrete masses of batch onto the surface of the molten glass bath in a predetermined pattern. As pointed out in this patent the use of two batch chargers, each feeding in alternate directions across the longitudinal center line of the furnace, avoids many of the problems associated with one or more longitudinally directed batch chargers in that the batch materials are more effectively distributed across the lateral width of the furnace to assure a more desirable distribution of the batch on the glass bath in the melting portion of the furnace. A subsequent U.S. Pat. No. 3,127,033 issued to the same inventor Mar. 31, 1964 shows a control mechanism for operating dual batch chargers of the type shown in the first Lyle patent so that for every charge or mass of batch material introduced on a diagonal to one side of the furnace, a charge of any desired size can be fed directly downstream on the center line of the furnace. Under the method described in the second Lyle patent the distribution of these charges retains a symmetrical pattern with respect to the furnace center line, but the method described therein limits the maximum continuous rate of glass batch charging to that of one charger. This is because one charger is operated alone during portions of the cycle, and when both are operated the speed must be cut in half to maintain the charging rate at the desired level. The speed control circuit for such a system is necessarily somewhat complex.

A primary object of the present invention is to provide a method and apparatus for controlling the introduction of three charges of batch to the furnace from three batch chargers so oriented in the doghouse portion of the furnace that two of the three batch chargers are always in operation according to a predetermined schedule to feed a large quantity of batch materials to the furnace, with the result that a substantial quantity of molten glass can be withdrawn from the discharge end of said furnace.

It is a further object of the present invention to accomplish the foregoing primary object in such a manner that the distribution of the charges will be adjustable and symmetrical with respect to the furnace center line.

Another object of the present invention is to provide a group of chargers in the furnace end wall so that they occupy a minimum space, and yet maintain optimum charging rate for each charger which is being operated. This results in a wider batch stream, or slug, than is possible with prior art systems.

SUMMARY OF INVENTION

The charging, or upstream end of a glassware furnace includes a doghouse through which batch material is introduced to the furnace through three openings defined in each of the three side walls of the doghouse. Each of the openings has associated therewith an intermittently operated batch feeding means or charger capable of feeding elongated masses of batch to the molten glass bath. The lines of action of these batch feeding means are so related angularly with respect to one another and to the longitudinal center line of the furnace that these lines of action cross at a point within the limits of the doghouse portion of the furnace, and in accordance with the presently preferred method of operating the above-described furnace two of the three chargers are operated together for predetermined and adjustable periods of time so as to feed two elongated masses along converging paths to form a composite charge angularly related to the lines of action of these chargers. A first composite mass of batch material enters the furnace at a moderate angle with respect to the center line of the furnace. A second composite mass is then fed down the center line of the furnace. A third mass of size similar to the first is fed to the opposite side of the center line of the furnace, followed by still another batch or charge down the center line of the furnace after which the cycle of operation is repeated so as to provide a continuously operable batch charging system for a glass melting furnace.

BRIEF DESCRIPTION OF THE DRAWINGS

FIG. 1 shows batch being fed through two of the three openings in the doghouse, that is by the center and right-hand batch charger, as a first step in the cycle of operation of the apparatus.

DETAILED DESCRIPTION

Figure 1:
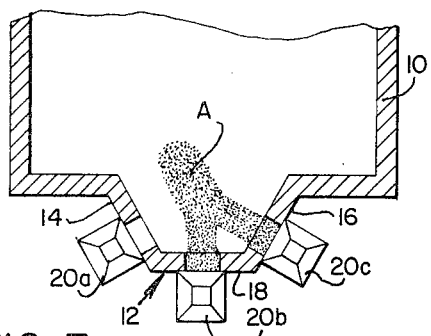
FIG. 1 is a schematic fragmentary plan view of the melting, or upstream end portion, of a glass melting furnace having a doghouse of generally isosceles trapezoidal shape defining three openings in the side walls thereof and having three batch feeders or chargers associated respectively with the three openings. Further.

Turning now to the drawings in greater detail, a conventional glass melting furnace of rectangular configuration is indicated generally by the reference numeral 10 and a doghouse portion of said furnace is indicated generally by the reference numeral 12. As shown, the doghouse 12 is located in generally centered relationship on the rear, or upstream end wall, of the furnace, and comprises a generally trapezoidal shaped appendage, having three walls projecting outwardly from the upstream end wall of the furnace. The left-hand side wall 14, and the right-hand side wall 16 are angularly related so as to define an isosceles trapezoid having a third wall 18 which defines the base of the trapezoid. The rear end wall of the furnace defines an open side thereof, and the equal length sides formed by the left-hand and right-hand side walls 14 and 16 respectively of the doghouse have openings through which batch material can be introduced. The end wall is parallel to the end wall of the furnace 10 and also has a suitable opening for feeding batch materials into the furnace.

Thus, the three side walls 14, 16 and 18 of the doghouse 12 each include a suitable opening through which batch material is adapted to be fed by a feeder or charger 20 of the type shown in the Lorenz U.S. Pat. No. 2,471,336. The Lorenz charger, or feeder, is mounted on a track or tracks for movement toward and away from the furnace, and as shown in this patent the chargers are to be driven by electric motors or the like so as to reciprocate a pusher, which pusher is adapted to thrust batch material from a hopper associated with each charger through an associated opening, or window in the doghouse portion of the furnace. Such a charger is commonly operated in an intermittent fashion so as to run for a predetermined period of time during which time the pusher continuously shoves discrete amounts of batch material into the furnace. As explained hereinbelow, the batch material is introduced during prescribed portions of the cycle.

Figure 3:
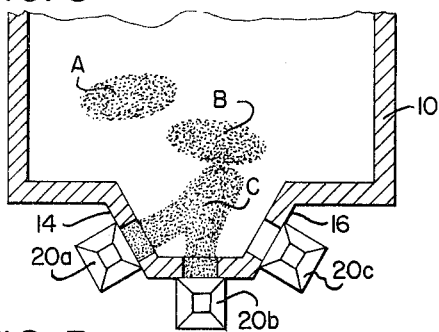
FIG. 3 is similar to FIGS. 1 and 2, being a mirror image of FIG. 1 and showing the left-hand batch charger and the center line batch charger in operation.
Figure 2:
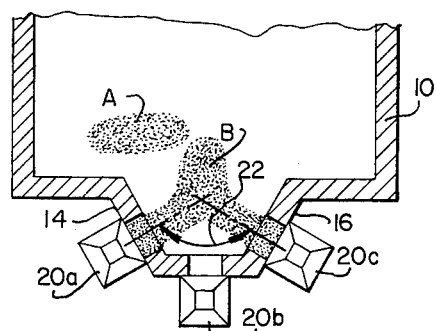
FIG. 2 is similar to FIG. 1 but shows the two batch chargers associated with the left and right-hand side walls of the trapezoidally shaped doghouse operating simultaneously for forming a batch or charge which is to be fed down the center line of the furnace.

As shown in FIG. 1 the center line batch charger 20b is associated with the rear most wall 18 of the doghouse and the charger 20c associated with the right-hand wall 16. Both chargers are feeding batch material simultaneously into the doghouse portion of the furnace with the result that a composite elongated mass A of batch material is being formed on the surface of the molten glass in the furnace 10. After both chargers 20b and 20c have operated for a predetermined period for which they are preset, these chargers are programmed to stop, and the charger 20a associated with the left-hand wall 14 of the doghouse, and the charger 20c associated with the right-hand wall 16 operate as shown in FIG. 2 so as to form a second composite mass of batch material on the surface of the molten glass as indicated at B in this view. As this batch of material B is being so formed, the previously formed charge A will drift toward the left and may be turned slightly as indicated in FIG. 2 as a result of formation of the second batch B. After this pair of batch chargers 20 a and 20c associated with the left and right-hand side walls of the doghouse have timed out, the charger 20a together with the center line batch charger 20b will be simultaneously operated so as to form still a third composite batch or charge C angularly directed toward the right-hand side of the furnace 10 as indicated in FIG. 3. The formation of the third charge C will tend to turn the charge B as indicated, and this third charge C will eventually reach the position shown in FIG. 4 with the result that the three charges of batch material will assume a predetermined pattern substantially as shown in this view. In this connection it is noted that the slugs of batch material may be closer to one another than is shown schematically in the drawings, the relative locations being spread apart somewhat for clarity. It should also be noted that these slugs may move into contact with one another to form a more-or-less continuous stream of batch material when viewed from above as in these views. However, if one observed these streams of batch material in an actual furnace these piles or slugs would still be apparent due to their moundlike appearance in elevation. So too, as these slugs move downstream in the molten glass, they tend to dissolve in accordance with the primary purpose of the furnace, that is to melt glass. The relative sizes of the slugs has, however, been kept constant as they move downstream in these drawings for purposes of clarity only.

Figure 5:
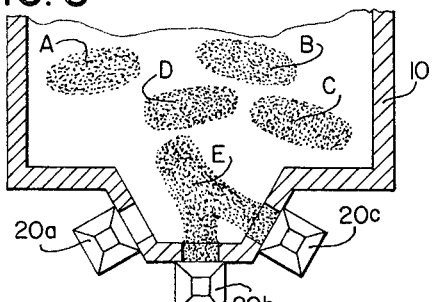
FIGS. 5, 6, 7 and 8 are similar to FIGS. 1 through 4, respectively, but show a succeeding cycle of operation of the batch charging system.
Figure 7:
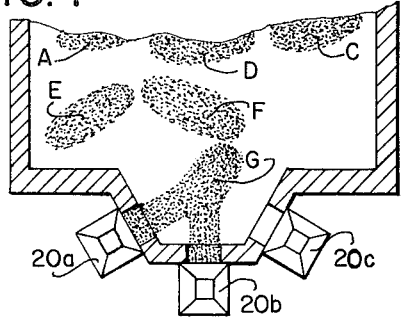
Figure 4:
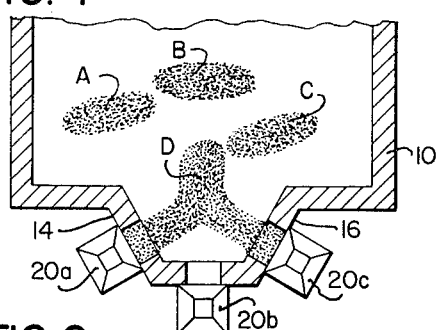
FIG. 4 is a view identical to that depicted in FIG. 2. It is noted that FIGS. 1 to 4 show complete cycle of operation of the batch charging system.
Figure 6:
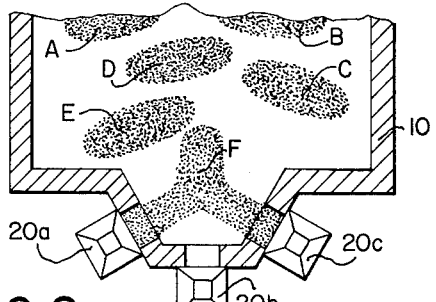
Figure 8:
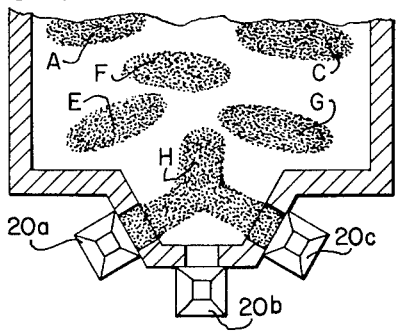

Still with reference to FIG. 4, and to the first complete cycle of operation of the batch chargers 20a and 20b and 20c, a fourth charge indicated generally at D will be formed in the same manner as described hereinabove with reference to FIG. 2 so that it will tend to follow the charge B and to be turned slightly as suggested in FIG. 5 so as to occupy an intermediate position between A and C.

FIGS. 5, 6, 7 and 8 show formation of further charges E, F, G and H respectively and correspond to the charges A, B, C and D described hereinabove with reference to FIGS. 1-4. Thus, FIGS. 5-8 show a second cycle of operation of the system, and it will be apparent that still another cycle of operation will produce a similar pattern of charges on the surface of the molten glass bath in the furnace. It is an important feature of the present invention that every other composite charge, B and D of batch material placed in the furnace is entered along the center line of the furnace, since this portion of the furnace is the hottest due to normal heat transfer relationships. On the other hand, between each such charge, B and D, an outwardly directed charge, C and E, is directed in the manner described with reference to FIGS. 3 and 5. This pattern sequence stabilizes those slugs on the furnace center line. That is, these center slugs B, D, F and H would tend to drift toward the furnace side walls but for the presence of the slugs A and E next to the left-hand wall and the slugs C and G next to the right-hand wall. These slugs A, E, C and G serve to stabilize the distribution of the slugs to achieve the desired slug distribution consistent with optimum slug movement downstream in the molten glass. The resulting geometrical configuration of batch masses or charges is achieved by the structure described herein when operated in accordance with the method of the present invention whereby the batch chargers need only operate at optimum speed to maintain the glass level constant. That is, they need not be operated at optimum and at half-speed in the manner required for the configuration shown in the prior art patent to Lyle U.S. Pat. No. 3,127,033 mentioned hereinabove. It is an important feature of the present invention that the lines of action of the left and right-hand batch chargers 20a and 20c are so related that they converge with one another at an angle in the range between 90° and 135°. More particularly, the preferred angular relationship has been found to be 120°. This angular relationship is best shown in FIG. 2 at 22. The center batch charger 20b is of course oriented to discharge batch material in the longitudinal direction associated with the center line of the generally rectangular furnace 10. As a result of this angular configuration of the batch chargers 20a, 20b, and 20c, the composite masses of batch material, indicated at A and C in FIGS. 1 and 3 respectively, are adapted to be directed at an angle of approximately 30° with respect to the center line of the furnace 10. This angular relationship will yield optimum results in a furnace designed to supply molten glass at the rate dictated by the combined continuous charging rate of two present day batch chargers.

Figure 9:
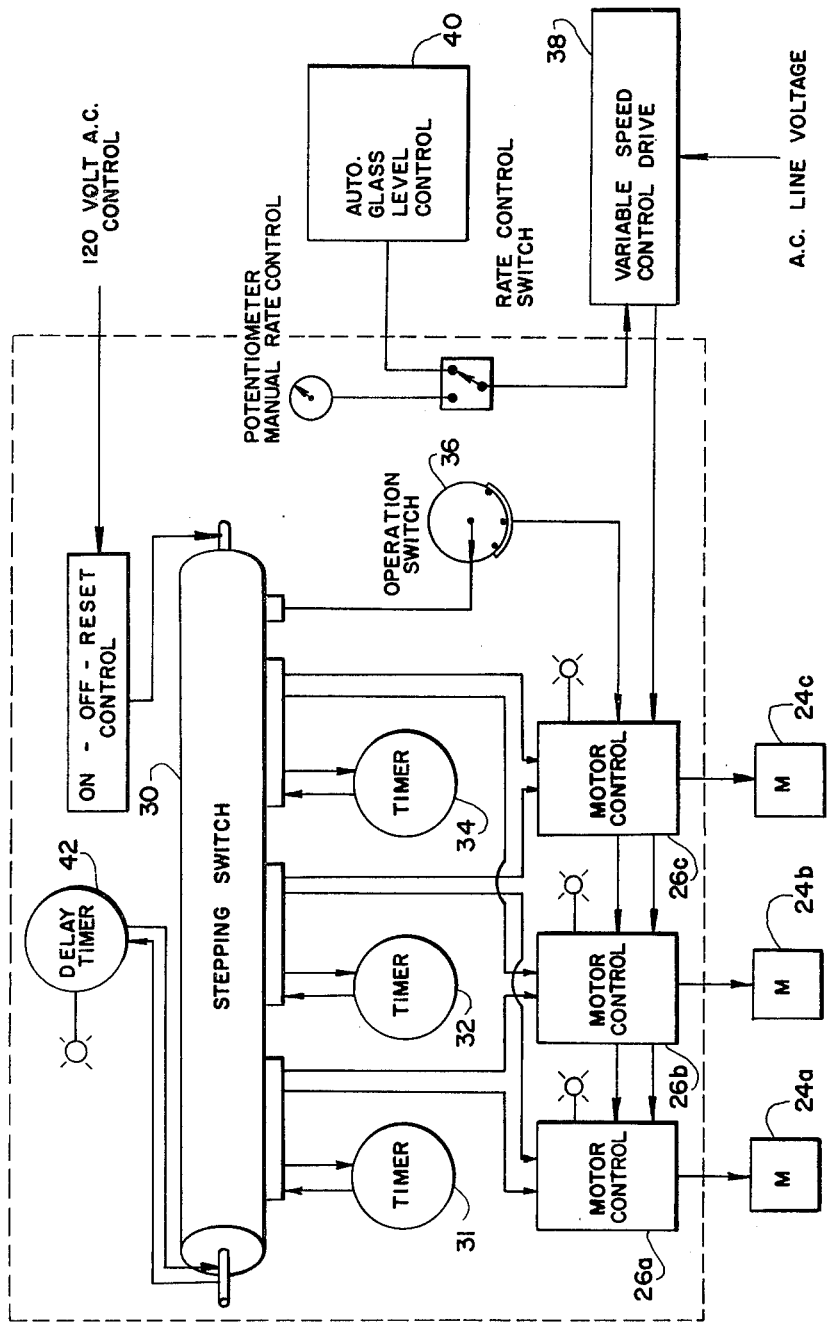
FIG. 9 is a schematic view of a control system for operating the batch chargers of FIGS. 1 to 8.

Turning now to a description of the control system shown schematically in FIG. 9, the three motors 24a, 24b, and 24c represent the drive means for operating the three batch chargers 22a, 22b and 22c respectively. The drive motors 24a, 24b and 24c have associated motor control circuits 26a, 26b and 26c respectively and these motor control circuits are energized in pairs through a stepping switch 30 for predetermined times dictated by the timers 31, 32 and 34. For example, timer 31 is adapted to operate the batch charger pair 20a and 20b so as to form charge C as shown in FIG. 3. Timer 32 operates chargers 20a and 20c to form charge B as shown in FIG. 2, and timer 34 operates chargers 20b and 20c to form charge A as shown in FIG. 1.

When the operation selector switch 36 is positioned as indicated, the stepping switch 30 sequentially selects the proper timer and the connection to the proper two motor controls or starters to provide the sequence previously described. The other three operation switch positions provide direct manual selection to operate any charger pair during testing or during repair of any timer or the stepping switch. Each timer is independently adjustable to provide the desired size of chargers to suit the particular furnace size and general rate of input.

Delay timer 42 is so connected into the stepping switch circuit that it will provide any length of delay which may be desired between each charging phase of the total timing cycle. Also, when it is set to zero, the sequence continues without introducing any delays.

Such delays are sometimes useful to encourage the charges of batch to break apart as they move into the furnace. Also, these delays are useful during light drain or "Holiday" time when the required overall charging rate is less than the minimum rate at which two chargers can run without stalling.

The overall charging rate is controlled as in the past by the use of a variable speed electric control drive 38 for the motors 24a, 24b and 24c. The charging rate setting can be made by a manual potentiometer or by suitable output signal from an automatic glass level control 40 as known to the art.

I claim:

1. In a glass melting furnace having an upstream end wall which includes a doghouse portion through which batch material is to be introduced to the furnace the improvement comprising, three openings defined in the doghouse, batch feeding means associated with each opening for feeding batch through its associated opening, said doghouse having three side walls which are so related angularly that two of said batch feeding means operate along angularly related lines of action which converge with one another at a point on the line of action of the third batch feeding means.

2. Apparatus according to claim 1 wherein the common point of intersection of the lines of action of the three batch chargers is located within the doghouse portion of the furnace and in spaced upstream relation to the line of junction of the doghouse and the furnace.

3. Apparatus according to claim 1 wherein the doghouse portion of the furnace is defined by three angularly related side walls one of which is parallel to the end wall of the furnace and defines one of said openings, and the other two of which doghouse side walls define said other two openings and are symmetrically arranged with respect to the line of action of said third batch feeding means.

4. Apparatus according to claim 1 wherein the line of action of said third batch feeding means is oriented generally perpendicularly to the upstream end wall of the furnace.

5. Apparatus according to claim 4 wherein said angularly related lines of action of said other two batch feeding means converge with one another at an angle in the range between 90° and 135°.

6. Apparatus according to claim 5 wherein said other two batch feeding means converge at an angle of substantially 120°.

7. A method of feeding batch to a glass melting furnace and comprising the steps of:
   a. providing three batch chargers at the upstream end of the furnace,
   b. orienting two of the three batch chargers so that these two operate along converging lines of action both of which are inclined at an angle of more than 45° but less than 75° with respect to the longitudinal center line of the furnace,
   c. orienting the third charger so that it is located between these two chargers and so that it operates on the center line of the furnace and intersects said lines of action of the two chargers at a common point,
   d. operating said chargers in pairs so that two of the three are simultaneously operated to sequentially feed an elongated composite mass of batch at a moderate angle to the furnace center line, after which the two inclined chargers operate to feed a second composite mass on the furnace center line.

8. The method according to claim 7 wherein said chargers are operated in pairs to feed composite masses of batch alternately to one side of the furnace center line as aforesaid then on the center line as aforesaid, followed by feeding a third mass to the opposite side of the center line, and finally feeding a fourth mass on the center line to complete a cycle of operation of said batch chargers.

9. The method according to claim 8 wherein the lines of action of said two batch chargers are inclined at an angle of approximately 60° with respect to the furnace center line, and wherein said composite masses formed by operation of any two adjacent pairs of batch chargers are formed at an angle of approximately 30° with respect to the composite masses formed by the two inclined batch chargers, the latter pair being oriented at equal but opposite angles to the furnace center line serving to feed every second and fourth composite mass downstream on the furnace center line.

* * * * *